(12) United States Patent
Warashina et al.

(10) Patent No.: US 7,486,846 B2
(45) Date of Patent: Feb. 3, 2009

(54) OPTICAL TRANSMITTING /RECEIVING MODULE

(75) Inventors: Yoshihisa Warashina, Hamamatsu (JP); Yasuji Hoshino, Hamamatsu (JP); Hajime Takeyama, Hamamatsu (JP); Masaaki Muto, Hamamatsu (JP)

(73) Assignee: Hammatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 10/589,605

(22) PCT Filed: Feb. 15, 2005

(86) PCT No.: PCT/JP2005/002248
§ 371 (c)(1),
(2), (4) Date: Aug. 9, 2007

(87) PCT Pub. No.: WO2005/078495
PCT Pub. Date: Aug. 25, 2005

(65) Prior Publication Data
US 2007/0286549 A1      Dec. 13, 2007

(30) Foreign Application Priority Data
Feb. 17, 2004   (JP) .............................. 2004-040445

(51) Int. Cl.
G02B 6/26 (2006.01)
(52) U.S. Cl. ......................................... 385/14; 385/49
(58) Field of Classification Search ........................ None
See application file for complete search history.

(56) References Cited

U.S. PATENT DOCUMENTS

| | | | | |
|---|---|---|---|---|
| 4,760,569 A | * | 7/1988 | Mahlein | 398/139 |
| 5,485,538 A | * | 1/1996 | Bowen et al. | 385/92 |
| 6,219,470 B1 | * | 4/2001 | Tu | 385/14 |
| 6,571,033 B2 | * | 5/2003 | Caracci et al. | 385/24 |

FOREIGN PATENT DOCUMENTS

| | | |
|---|---|---|
| EP | 0 844 503 | 5/1998 |
| JP | 64-48007 | 2/1989 |
| JP | 3-168606 | 7/1991 |
| JP | 5-333249 | 12/1993 |
| JP | 7-74343 | 3/1995 |
| JP | 10-197762 | 7/1998 |
| JP | 11-068705 | 3/1999 |
| JP | 11-218651 | 8/1999 |
| JP | 2001-264594 | 9/2001 |

* cited by examiner

Primary Examiner—Sung H Pak
Assistant Examiner—Mike Stahl
(74) Attorney, Agent, or Firm—Drinker Biddle & Reath LLP

(57) ABSTRACT

An optical transmitting and receiving module, with which there is no need to provide a submount for disposing a photodiode on a substrate and with which spatial restrictions can be made small, is provided. An optical transmitting and receiving module 1 has a light transmitting substrate 10. A filter groove 13 is formed on a top surface of light transmitting substrate 10, and a dielectric multilayer film filter 23 is set in filter groove 13. An optical fiber 21 and a laser diode 25 are disposed at opposite positions across dielectric multilayer film filter 23. Also, a photodiode 26 is disposed on a rear surface side of light transmitting substrate 10. Photodiode 26 is positioned directly below a line connecting optical fiber 21 and laser diode 25.

8 Claims, 6 Drawing Sheets

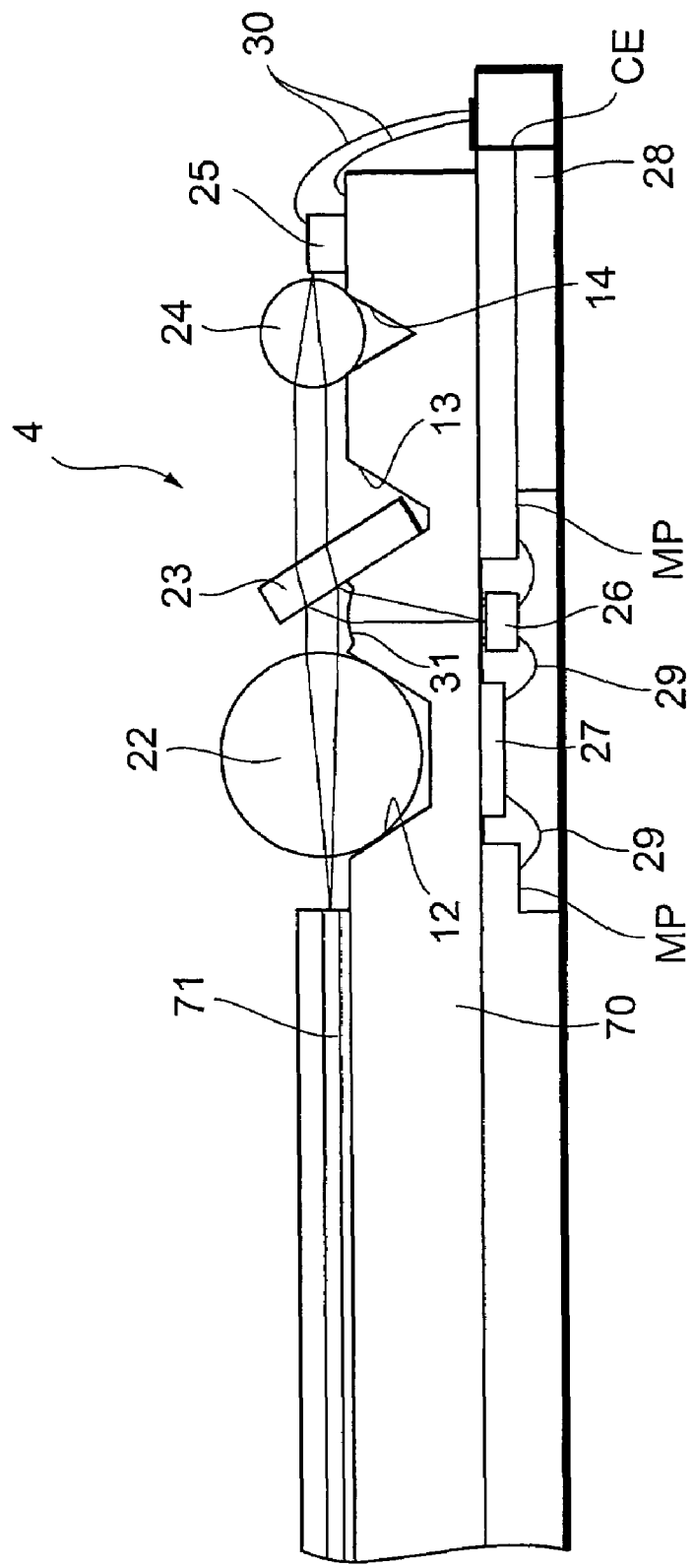

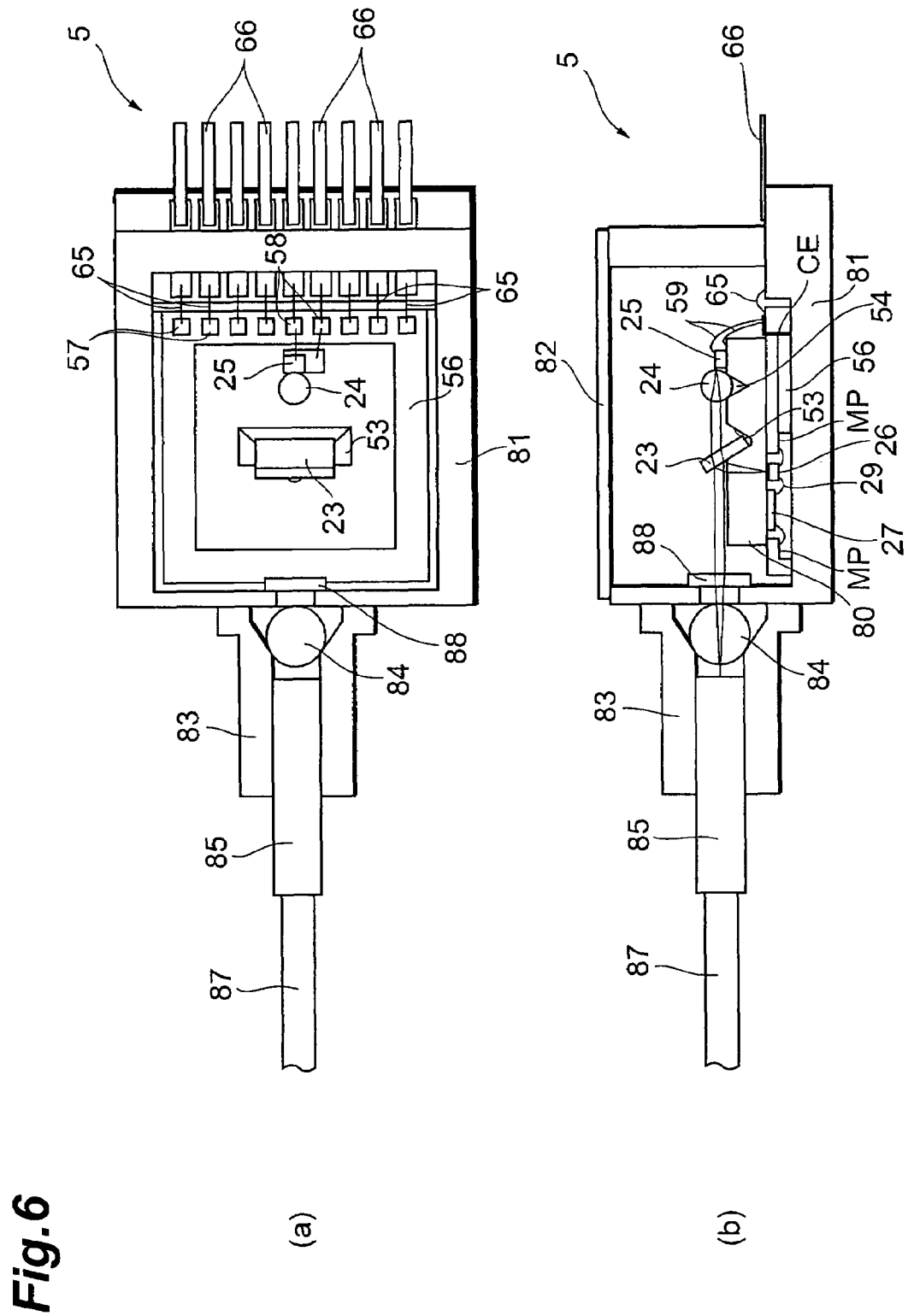

OPTICAL TRANSMITTING /RECEIVING MODULE

TECHNICAL FIELD

This invention relates to an optical transmitting and receiving module for performing transmission and reception of optical signals in optical communication, optical information processing, etc.

BACKGROUND ART

For connecting homes and base stations with optical fibers and performing transmission and reception of optical signals, wavelength division multiplex type optical transmitting and receiving modules, using, for example, optical signals of a 1.3 μm band for uploading and optical signals of a 1.55 μm band for downloading, have been developed. An example of such an optical transmitting and receiving module is disclosed in Japanese Published Unexamined Patent Application No. H11-68705 (Patent Document 1).

This optical transmitting and receiving module has a flat substrate, and an optical branching waveguide is formed on the flat substrate. A groove is provided at a branching portion of the optical branching waveguide, and in this groove is disposed a dielectric multilayer film filter that branches input light into a transmitting direction and a reflecting direction according to wavelength. Also, a transmitting laser diode and a receiving photodiode are disposed on the flat substrate. The transmitting wavelength of the dielectric multilayer film filter is set to the received wavelength of the receiving photodiode, the blocking wavelength is set to the oscillating wavelength of the transmitting laser diode, and the transmitting laser diode and the receiving photodiode are disposed at opposite positions across the dielectric multilayer film filter.

Patent Document 1: Japanese Published Unexamined Patent Application No. H11-68705

DISCLOSURE OF THE INVENTION

Problem to be Solved by the Invention

With the optical transmitting and receiving module disclosed in the above-mentioned Patent Document 1, the transmitting laser diode, the dielectric multilayer film filter, and the receiving photodiode are disposed on a top surface of the flat substrate. Because the receiving photodiode must thus be disposed, for example, on a submount that is erected on the top surface of the flat substrate, the mounting error is large and alignment is difficult.

Also, because the transmitting laser diode, the receiving photodiode, and the dielectric multilayer film filter must be disposed on the substrate, spatial restrictions are large. Or, to realize a mode in which a submount is not provided, for example, a side-illuminated type photodiode, etc., has to be used.

In particular, because the transmitting laser diode, the receiving photodiode, and the dielectric multilayer film filter cannot be positioned along a straight line due to use of the transmitting and reflecting characteristics of the dielectric multilayer film filter, two-dimensional spatial restrictions are large. Thus, when these components are to be positioned in array form, the area of the flat substrate has to be made extremely large.

Thus, an object of this invention is to provide an optical transmitting and receiving module, with which there is no need to provide a submount for disposing a photodiode on a substrate and with which spatial restrictions can be made small.

Means for Solving the Problem

In order to achieve the above object, this invention provides an optical transmitting and receiving module including: a light transmitting substrate, transmitting light of a first wavelength; a laser diode, set on the light transmitting substrate and emitting light of a second wavelength that differs from the first wavelength; a photodiode, mounted on a rear surface side of the light transmitting substrate surface on which the laser diode is disposed; a dielectric film filter, reflecting light of the first wavelength and transmitting light of the second wavelength; and an optical input and output portion, inputting light emitted from the laser diode and outputting light to the photodiode; and wherein the dielectric film filter is set in an inclined groove, formed at a predetermined inclination angle in the light transmitting substrate, so as to match optical paths between the photodiode and the optical input and output portion and match optical paths between the laser diode and the optical input and output portion.

With the optical transmitting and receiving module according to this invention, a light transmitting substrate is used as the substrate, and the photodiode is disposed on the rear surface side of this transparent substrate. Light that is emitted from the optical input and output portion is reflected by the dielectric film filter set in the inclined groove, which is adjusted to be of the predetermined angle, and is thereby made to arrive at the photodiode reliably. The light reflected by the dielectric film filter is thus made incident on the photodiode upon being transmitted through the light transmitting substrate. Because there is thus no need to separately provide a submount for disposing the photodiode, mounting errors can be reduced. Also, because all elements on the light transmitting substrate can be positioned by semiconductor processes, the positional precision can be made high. Furthermore, because the photodiode is disposed on the rear surface side, spatial restrictions on the light transmitting substrate are relaxed accordingly.

Here, a mode in which the light transmitting substrate is a silicon substrate is possible.

As the light transmitting substrate, a silicon substrate with a light transmitting property can be used favorably.

Also, a mode is possible in which the inclined groove is formed by anisotropic etching.

By forming the inclined groove by anisotropic etching on the light transmitting substrate, the inclined groove can be formed with high precision.

Furthermore, a mode is possible in which the photodiode is positioned directly below a line connecting the laser diode and the optical input and output portion.

By the photodiode thus being positioned directly below the line connecting the laser diode and the optical input and output portion, spatial restrictions in planar directions of the light transmitting substrate can be relaxed.

Also, a mode is possible in which a plurality of sets of the photodiode, the laser diode, and the dielectric film filter are disposed in array form.

In such a mode in which a plurality of sets of the photodiode, the laser diode, and the dielectric film filter are disposed in array form, by each photodiode being positioned directly below a line connecting the corresponding laser diode and optical input and output portion, an arrangement that is extremely compact as a whole can be realized.

Furthermore, a mode is possible in which collimating lenses are disposed respectively between the dielectric film filter and the laser diode and between the dielectric film filter and the optical input and output portion.

By the collimating lenses being provided, light can be reliably transmitted without dispersion between the laser diode and the optical input and output portion and between the photodiode and the optical input and output portion.

Also, a mode is possible in which a converging lens that converges light onto the photodiode is disposed on a top surface of the light transmitting substrate.

By the converging lens being provided, light can be converged onto the photodiode reliably.

A mode is possible in which the converging lens is formed by ion beam etching.

By forming the converging lens by ion beam etching, the converging lens can be formed with high positional precision.

Furthermore, a mode is possible in which the optical input and output portion is a front end portion of an optical fiber or in which the optical input and output portion is a front end portion of an optical waveguide.

The optical input and output portion can thus be arranged as the front end portion of an optical fiber or the front end portion of an optical waveguide.

Effect of the Invention

With this invention, an optical transmitting and receiving module, with which there is no need to provide a submount for disposing a photodiode on a substrate and with which spatial restrictions can be made small, can be provided.

BRIEF DESCRIPTION OF THE DRAWINGS

FIG. 5 is a sectional side view of an optical transmitting and receiving module according to a fourth embodiment of this invention.

FIG. 6 shows diagrams of an optical transmitting and receiving module according to a fifth embodiment of this invention, with FIG. 6(a) being a plan view and FIG. 6(b) being a sectional side view.

DESCRIPTION OF THE SYMBOLS

Figure 1:
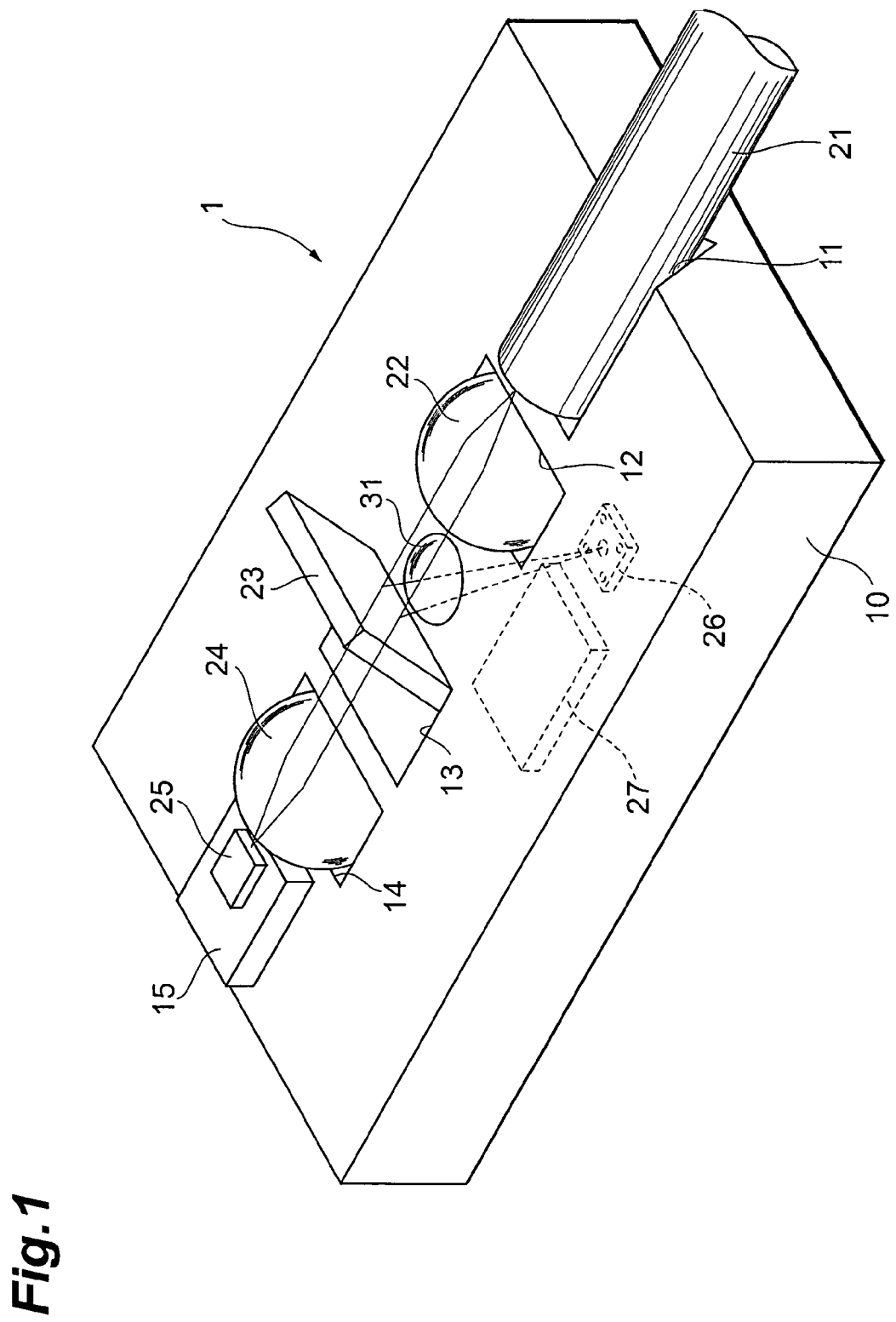
FIG. 1 is a perspective view of an optical transmitting and receiving module according to a first embodiment of this invention.

1~5 optical transmitting and receiving module
10, 40, 50, 70, 80 light transmitting substrate
11, 51 V-groove
12, 52 first lens groove
13, 41, 53 filter groove
14, 54 second lens groove
15, 43 mount
21 optical fiber
22, 84 first ball lens
23, 32, 42 dielectric multilayer film filter
24 second ball lens
25 laser diode
26 photodiode
27 amplifier
28, 56 wiring substrate
29, 59, 65 bonding wire
31 convex lens
57 output bonding pad
58 input bonding pad
60, 85 fiber ferrule
61 metallized fiber
62, 87 jacketed fiber
63, 81 ceramic package
64 input/output pad
66 electrical input/output terminal
67, 82 cap
71 optical waveguide
83 lens holder
88 transparent window

BEST MODES FOR CARRYING OUT THE INVENTION

Preferred embodiments of this invention shall now be described with reference to the drawings. In the respective embodiments, portions having the same function may be provided with the same symbol and overlapping description may be omitted.

Figure 2:
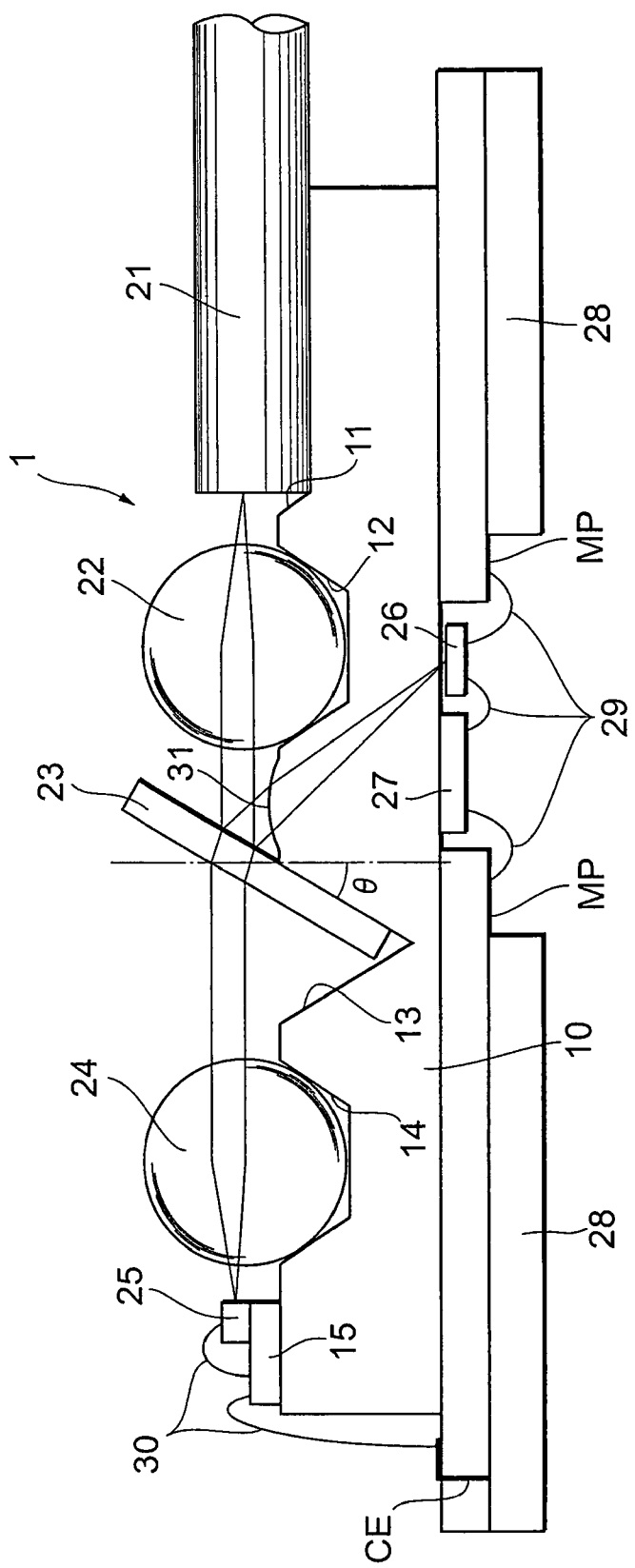
FIG. 2 is a sectional view of the optical transmitting and receiving module according to the first embodiment of this invention.

FIG. 1 is a perspective view of an optical transmitting and receiving module according to a first embodiment of this invention, and FIG. 2 is a sectional view of the same.

As shown in FIGS. 1 and 2, an optical transmitting and receiving module 1 according to the present embodiment is used, for example, as a home module for performing optical communication upon connection of a home and a base station by an optical fiber and has a light transmitting substrate 10. Light transmitting substrate 10 is a silicon substrate and transmits light of a 1.55 μm wavelength band that is used for download traffic. A V-groove 11, a first lens groove 12, a filter groove 13, which is an inclined groove of this invention, and a second lens groove 14 are formed on a top surface of this light transmitting substrate 10, and these components are positioned along a straight line.

V-groove 11 is formed to extend from an edge of light transmitting substrate 10 and in a direction orthogonal to the edge. First lens groove 12 is formed so that the center point of first lens groove 12 is positioned along an extension of the center line of V-groove 11. Filter groove 13 is formed so that the center point of filter groove 13 is positioned further along the extension, and second lens groove 14 is formed so that the center point of second lens groove 14 is positioned yet further along the extension.

A front end portion of an optical fiber 21, which is to be an optical input and output portion of this invention, is set in V-groove 11. Optical fiber 21 has quartz glass as its main component, and by being set in V-groove 11, its center line is matched with the center line of V-groove 11. The other end portion of optical fiber 21 is connected to an unillustrated optical transmitting and receiving module disposed at the base station.

A first ball lens 22, which is a collimating lens of this invention, is set in first lens groove 12, and first ball lens 22 is adhered to substrate 10 by an adhesive agent. First ball lens 22 is formed of spherical borosilicate glass, and by being set in first lens groove 12, the center of first ball lens 22 is positioned along an optical axis of light that enters into or exits from the front end portion of optical fiber 21. Light emitted from optical fiber 21 is made into collimated light by this first ball lens 22. As the adhesive agent, an epoxy-based or acrylic-based adhesive agent can be used favorably.

A dielectric multilayer film filter 23, which is a dielectric film filter (wavelength multiplexer/demultiplexer) of this invention, is set in filter groove 13, and dielectric multilayer film filter 23 is adhered onto substrate 10 by an adhesive agent. Dielectric multilayer film filter 23 has wavelength selectivity, and transmits light of a first wavelength, which is of a wavelength band of 1.3 μm in the present embodiment, and reflects light of a second wavelength, which differs from the first wavelength and is of the 1.55 μm wavelength band in the present embodiment. As the dielectric film filter, a filter with which a dielectric material is formed into a single layer film may be used instead.

A second ball lens 24, which is a collimating lens of this invention, is set in second lens groove 14, and second ball lens 24 is adhered to substrate 10 by an adhesive agent. As with first ball lens 22, second ball lens 24 is formed of borosilicate glass, and by being set in second lens groove 14, the center of second ball lens 24 is positioned along the optical axis of light that enters into or exits from the optical fiber and is transmitted through dielectric multilayer film filter 23.

Furthermore, a mount 15 is installed on the top surface of light transmitting substrate 10, and a laser diode 25 is mounted onto mount 15. Optical fiber 21 and laser diode 25 are thus disposed at opposite positions across dielectric multilayer film filter 23. Laser diode 25 emits light of the 1.3 μm wavelength band. The light emitted from laser diode 25 is made incident onto optical fiber 21 via second ball lens 24, dielectric multilayer film filter 23, and first ball lens 22. The light emitted from laser diode 25 is made into collimated light by second ball lens 24.

V-groove 11, first lens groove 12, filter groove 13, and second lens groove 14 on the top surface of light transmitting substrate 10 are respectively formed to be of predetermined angles and depths by anisotropic etching. Specifically, the angles and depths are set so that by simply dropping optical fiber 21, first ball lens 22, dielectric multilayer film filter 23, and second ball lens 24 into V-groove 11, first lens groove 12, filter groove 13, and second lens groove 14, respectively, the optical axes of the light that passes through these respective elements are matched.

A photodiode 26 is disposed on a rear surface side of light transmitting substrate 10. Photodiode 26 is a so-called back-illuminated photodiode and a photodetecting surface thereof is positioned so as to face the rear surface of light transmitting substrate 10. This photodiode 26 is positioned at a position at which the light of the 1.55 μm wavelength band that is emitted from optical fiber 21 and is reflected by dielectric multilayer film filter 23 arrives. Photodiode 26 is positioned directly below a line connecting optical fiber 21 and laser diode 25, in other words, along a plane that includes this line and extends in the thickness direction of light transmitting substrate 10.

Filter groove 13, in which dielectric multilayer film filter 23 is set, is formed in light transmitting substrate 10 with an inclination angle θ, shown in FIG. 2, being adjusted to a predetermined angle. Specifically, this inclination angle θ is adjusted to an angle such that light emitted from optical fiber 21 is reflected by dielectric multilayer film filter 23 and photodiode 26 is positioned in the direction of reflection. In the present embodiment, the inclination angle θ is set to 54.7 degrees. By dielectric multilayer film filter 23 being set in filter groove 13, the optical axes between laser diode 25 and optical fiber 21 and between photodiode 26 and optical fiber 21 are partially matched.

Furthermore, on the rear surface side of light transmitting substrate 10, an amplifier 27 and a wiring substrate 28 are disposed via unillustrated pads. Of these, amplifier 27, as with photodiode 26, is positioned directly below the line connecting optical fiber 21 and laser diode 25. Wiring substrate 28 is made of ceramic material and is formed to cover substantially the entire rear surface of light transmitting substrate 10 with the exception of photodiode 26 and amplifier 27.

As shown in FIG. 2, photodiode 26 is connected via bonding wires 29 to metallized patterns MP provided on amplifier 27 and wiring substrate 28. Upon receiving light on the photodetecting surface, photodiode 26 outputs signals, obtained by electrical conversion of the light, to amplifier 27. Amplifier 27 amplifies the electrical signals output from photodiode 26 and outputs the amplified signals to wiring substrate 28. Among metallized patterns MP on wiring substrate 28, there are those that are connected to laser diode 25 via wirings CE, which pass through contact holes, and bonding wires 30, etc.

Also, a convex lens 31, which is a converging lens of this invention, is formed at a position of the top surface of light transmitting substrate 10 through which light reflected from dielectric multilayer film filter 23 passes. Convex lens 31 converges the light emitted from optical fiber 21 and reflected by dielectric multilayer film filter 23 toward the photodetecting surface of photodiode 26. This convex lens 31 is formed by ion beam etching.

Actions of optical transmitting and receiving module 1 according to the present embodiment of the above-described arrangement shall now be described.

In optical transmitting and receiving module 1 according to this embodiment, light of the 1.3 μm wavelength band is emitted from laser diode 25 based on electrical signals from an unillustrated driving circuit. The light emitted from laser diode 25 is made into collimated light by second ball lens 24 and reaches dielectric multilayer film filter 23. Because light of the 1.3 μm wavelength band is transmitted through dielectric multilayer film filter 23, the light emitted from laser diode 25 reaches first ball lens 22. At first ball lens 22, the collimated light is converged toward the front end portion of optical fiber 21. The converged light of the 1.3 μm wavelength band enters optical fiber 21 and is transmitted as an optical signal to the unillustrated optical transmitting and receiving module disposed at the base station.

Meanwhile, from the optical transmitting and receiving module at the base station, optical signals of light of the 1.55 μm wavelength band are transmitted toward optical transmitting and receiving module 1 for home use via optical fiber 21. The light of these optical signals is emitted form the front end portion of optical fiber 21. The light emitted from the front end portion of optical fiber 21 arrives at first ball lens 22. The light emitted from optical fiber 21 is made into collimated light by first ball lens 22 and reaches dielectric multilayer film filter 23.

At dielectric multilayer film filter 23, because light of the 1.55 μm wavelength band is reflected, the light emitted from optical fiber 21 is reflected. Here, dielectric multilayer film filter 23 is set in filter groove 13 that is formed to the predetermined angle. The light reflected at dielectric multilayer film filter 23 is thus directed with high precision in the direction of convex lens 31, formed on light transmitting substrate 10. At convex lens 31, the collimated light reflected by dielectric multilayer film filter 23 is converged. The converged light is directed with high precision toward the photodetecting surface of photodiode 26.

At photodiode 26, the light, converged by convex lens 31, is received by the photodetecting surface, and predetermined electrical signals are thus output to amplifier 27. At amplifier 27, the electrical signals output from photodiode 26 are amplified and output to wiring substrate 28.

Optical signals that differ in wavelength are thus transmitted and received at optical transmitting and receiving module 1 according to the present embodiment. Optical transmitting and receiving module 1 according to this embodiment has laser diode 25, which emits optical signals, and photodiode 26, onto which optical signals are made incident, and photodiode 26 is disposed on the rear surface side of light transmitting substrate 10. Because there is thus no need to separately provide a submount, etc., for installing photodiode 26, spatial restrictions are lessened accordingly. There is also no need to employ a side-illuminated type photodiode, etc.

Also, with optical transmitting and receiving module 1 according to this embodiment, dielectric multilayer film filter 23 is set in filter groove 13, and this filter groove 13 is formed by anisotropic etching. Because filter groove 13 can thus be formed accurately in terms of inclination angle, the light emitted from optical fiber 21 can be guided precisely to photodiode 26.

Furthermore, with optical transmitting and receiving module 1 according to this embodiment, V-groove 11, in which optical fiber 21 is set, and lens grooves 12 and 14, in which ball lenses 22 and 24 are set respectively, are also formed to predetermined depths by anisotropic etching. Thus, by simply dropping the respective elements, that is, optical fiber 21, ball lenses 22 and 24, and dielectric multilayer film filter 23, into the corresponding grooves, these elements can be aligned precisely.

Also, with optical transmitting and receiving module 1 according to this embodiment, convex lens 31 is formed directly on the top surface of light transmitting substrate 10 by ion beam etching. A converging lens thus does not have to be provided separately on the top surface or the rear surface of light transmitting substrate 10. Furthermore, with optical transmitting and receiving module 1 according to this embodiment, photodiode 26 is disposed directly below the line connecting optical fiber 21 and laser diode 25. Spatial restrictions in planar directions of light transmitting substrate 10 can thus be relaxed.

Figure 3:
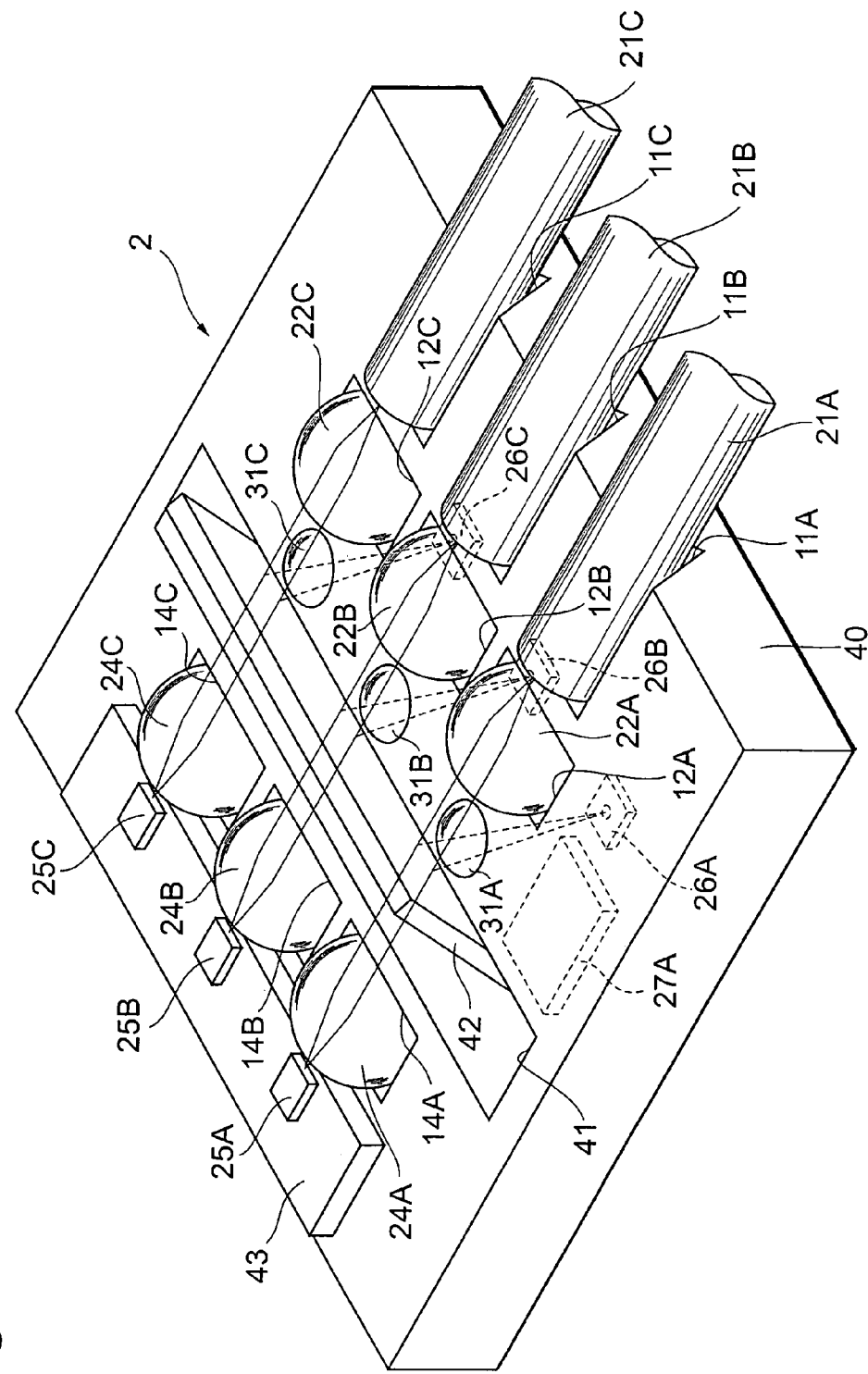
FIG. 3 is a perspective view of an optical transmitting and receiving module according to a second embodiment of this invention.

A second embodiment of this invention shall now be described. An optical transmitting and receiving module according to this embodiment is of a so-called array form, in which a plurality, that is, three in the present embodiment, of optical fibers are disposed. FIG. 3 is a perspective view of the optical transmitting and receiving module according to the second embodiment of this invention.

As shown in FIG. 3, optical transmitting and receiving module 2 according to this embodiment has a light transmitting substrate 40, formed of a silicon substrate that transmits light of the 1.55 μm band. A left V-groove 11A of the same arrangement as that of the above-described first embodiment is formed on a top surface of light transmitting substrate 40, and a left optical fiber 21A is set in this left V-groove 11A. A left first lens groove 12A is formed along an extension of left V-groove 11A, and filter groove 41 is formed further along the extension. This filter groove 41 is formed so as to extend in a direction orthogonal to the direction in which left V-groove 11A extends. Along the extension of left V-groove 11A beyond filter groove 41 is formed a left second lens groove 14A. These respective grooves 11A, 12A, 41, and 14A are respectively adjusted to be of predetermined depths and angles by anisotropic etching.

Left optical fiber 21A is set in left V-groove 11A and a left first ball lens 22A is set in left first lens groove 12A. A dielectric multilayer film filter 42 is set in filter groove 41, and a left second ball lens 24A is set in left second lens groove 14A.

Furthermore, on the top surface of light transmitting substrate 40 along the extension of left V-groove 11A and beyond the position at which left second lens groove 14A is formed is disposed a mount 43. Mount 43 is formed so as to extend in a direction orthogonal to the direction of extension of left V-groove 11A, and along the extension of left V-groove 11A on mount 43 is mounted a left laser diode 25A.

Also, at a rear surface side of light transmitting substrate 40, left photodiode 26A is mounted. This left photodiode 26A is positioned directly below a line connecting left optical fiber 21A and left laser diode 25A. A left amplifier 27A is disposed at a position adjacent to left photodiode 26A. As with left photodiode 26A, left amplifier 27A is also positioned directly below the line connecting left optical fiber 21A and left laser diode 25A.

Furthermore, with light transmitting substrate 40 according to this embodiment, a middle V-groove 11B and a right V-groove 11C of the same arrangement as left V-groove 11A are formed, and these three V-grooves 11A, 11B and 11C are separated at equal intervals in the direction of an edge of light transmitting substrate 40. A middle first lens groove 12B and a middle second lens groove 14B are formed along the extension of middle V-groove 11B. Also, a right first lens groove 12C and a right second lens groove 14C are formed along the extension of right V-groove 11C.

Also, a middle optical fiber 21B is set in middle V-groove 11B, and a right optical fiber 21C is set in right V-groove 11C. A middle first ball lens 22B is set in middle first lens groove 12B, and a right first ball lens 22C is set in right first lens groove 12C. A middle second ball lens 24B is set in middle second lens groove 14B, and a right second ball lens 24C is set in right second lens groove 14C.

Both filter groove 41 and mount 43 extend so as to include positions from those along the extension of left V-groove 11A to those along the extension of right V-groove 11C. A middle laser diode 25B is mounted along the extension of middle V-groove 11B on mount 43, and a right laser diode 25C is mounted along the extension of right V-groove 11C on mount 43. Also, dielectric multilayer film filter 42 in filter groove 41 is positioned so as to extend from a position along left V-groove 11A to a position along right V-groove 11C.

Furthermore, a middle photodiode 26B and a right photodiode 26C are mounted onto the rear surface side of light transmitting substrate 40. Middle photodiode 26B is positioned directly below a line connecting middle optical fiber 21B and middle laser diode 25B. A middle amplifier (not shown) is disposed at a position adjacent to middle photodiode 26B. As with middle photodiode 26B, this middle amplifier is also positioned directly below the line connecting middle optical fiber 21B and middle laser diode 25B.

Right photodiode 26C is positioned directly below a line connecting right optical fiber 21C and right laser diode 25C. A right amplifier (not shown) is disposed at a position adjacent to right photodiode 26C. As with right photodiode 26C, this right amplifier is also positioned directly below the line connecting right optical fiber 21C and right laser diode 25C.

Furthermore, a left convex lens 31A is formed on the top surface of light transmitting substrate 40 between left first lens groove 12A and filter groove 41 and along the extension of left V-groove 11A. Likewise, a middle convex lens 31B is formed between middle first lens groove 12B and filter groove 41 and along the extension of middle V-groove 11B, and a right convex lens 31C is formed between right first lens groove 12C and filter groove 41 and along the extension of right V-groove 11C. All of these convex lenses 31A to 31C are formed by ion beam etching.

Light emitted from left optical fiber 21A is reflected by dielectric multilayer film filter 42, converged by left convex lens 31A, and made incident on a photodetecting surface of left photodiode 26A. Light emitted from middle optical fiber 21B is reflected by dielectric multilayer film filter 42, converged by middle convex lens 31B, and made incident on a photodetecting surface of middle photodiode 26B. Furthermore, light emitted from right optical fiber 21C is reflected by dielectric multilayer film filter 42, converged by right convex lens 31C, and made incident on a photodetecting surface of right photodiode 26C.

Optical transmitting and receiving module 2 according to the present embodiment of the above-described arrangement has laser diodes 25A to 25C that emit optical signals and photodiodes 26A to 26C onto which optical signals are made incident, and as with the above-described first embodiment, photodiodes 26A to 26C are disposed on the rear surface side of light transmitting substrate 40. Because there is thus no need to separately provide submounts, etc., for installing photodiodes 26A to 26C, spatial restrictions are lessened accordingly. There is also no need to employ side-illuminated type photodiodes, etc.

Also, with optical transmitting and receiving module 2 according to this embodiment, a plurality of optical fibers 21A to 21C are connected and corresponding laser diodes 25A to 25C and photodiodes 26A to 26C are provided. This arrangement is thus extremely favorable in that spatial restrictions are lessened. Also, with optical transmitting and receiving module 2 according to this embodiment, photodiodes 26A to 26C are respectively disposed immediately below lines connecting optical fibers 21A to 21C and laser diodes 25A to 25C. Spatial restrictions in planar directions of light transmitting substrate 40 are thus relaxed, and a mode in which several optical fibers are connected can be realized in optical transmitting substrate 40 of small area.

Also, because as in the above-described first embodiment, filter groove 41 is formed by anisotropic etching, filter groove 41 can be formed accurately in terms of inclination angle. The lights emitted from optical fibers 21A to 21C can thus be guided precisely to photodiodes 26A to 26C. Furthermore, V-grooves 11A to 11C and lens grooves 12A to 12C and 14A to 14C are formed to predetermined depths by anisotropic etching. The respective elements, such as optical fibers 21A to 21C and ball lenses 22A to 22C and 24A to 24C, can thus be readily aligned precisely.

Figure 4:
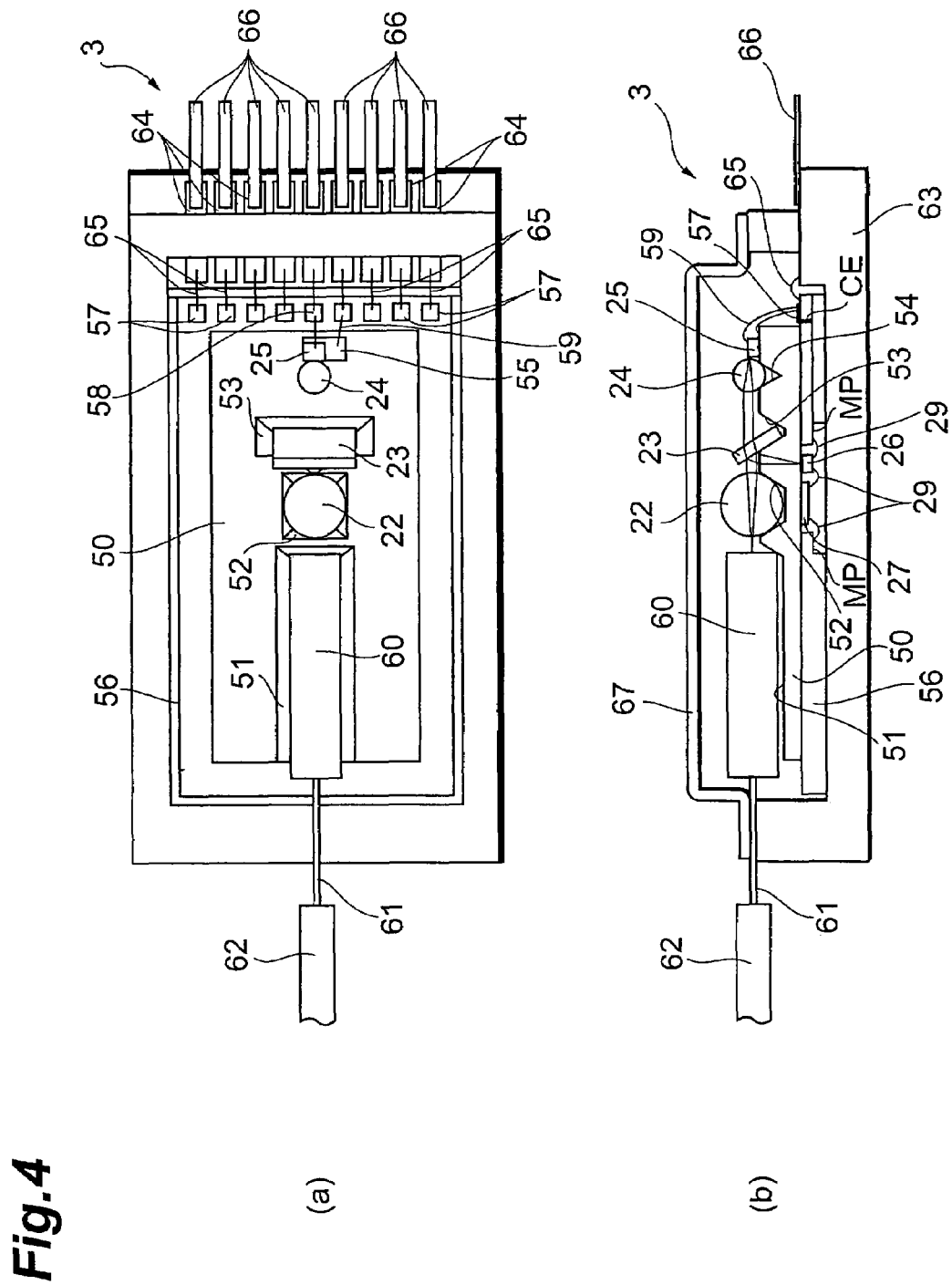
FIG. 4 shows diagrams of an optical transmitting and receiving module according to a third embodiment of this invention, with FIG. 4(a) being a plan view and FIG. 4(b) being a side view.

A third embodiment of this invention shall now be described. With an optical transmitting and receiving module according to this embodiment, a light transmitting substrate is formed so as to be incorporated in a package. FIG. 4 shows diagrams of the optical transmitting and receiving module according to the third embodiment of this invention, with FIG. 4(a) being a plan view and FIG. 4(b) being a side view. In FIG. 4(a), illustration of a cap is omitted.

As shown in FIG. 4, optical transmitting and receiving module 3 according to this embodiment has a light transmitting substrate 50. As in the above-described first embodiment, light transmitting substrate 50 is formed of a silicon substrate and transmits light of the 1.55 μm wavelength band. On a top surface of light transmitting substrate 50 is formed a V-groove 51 that differs from that of the above-described first embodiment in being larger, and a fiber ferrule 60 is set on V-groove 51. A jacketed fiber 62 is connected via a metallized fiber 61 to fiber ferrule 60. Also, a first lens groove 52, a filter groove 53, and a second lens groove 54 are formed on the top surface of light transmitting substrate 50. A first ball lens 22, which differs from that of the first embodiment in just being larger in diameter, is set in first lens groove 52.

Dielectric multilayer film filter 23 of the same arrangement as that of the above-described first embodiment is set in filter groove 53. Furthermore, a second ball lens 24, which differs from that of the first embodiment in just being smaller in diameter, is set in second lens groove 54.

Furthermore, along an extension of fiber ferrule 60 on the top surface of light transmitting substrate 50 is adhered a metallized pattern 55, and laser diode 25 is set on metallized pattern 55. With optical transmitting and receiving module 3 according to the present embodiment, laser diode 25 and second ball lens 24, such that a light emitting portion of laser diode 25 is of substantially the same position in height as the center of second ball lens 24, are used.

On a rear surface side of light transmitting substrate 50, photodiode 26 and amplifier 27 are mounted via unillustrated pads. Amplifier 27 is mounted at a position adjacent to photodiode 26. Photodiode 26 and amp 27 are positioned directly below a line connecting fiber ferrule 60 and laser diode 25. Also, a convex lens is formed by ion beam etching at a position of the top surface of light transmitting substrate 50 through which light reflected from dielectric multilayer film filter 23 passes.

A ceramic wiring substrate 56 is disposed on the rear surface side of light transmitting substrate 50. Wiring substrate 56 is made larger than light transmitting substrate 50 in its size in plan view and has through holes formed so as to make a space for photodiode 26 and amplifier 27. At positions of the top surface of wiring substrate 56 that fall outside the range of the light transmitting substrate are disposed a plurality of output bonding pads 57 and input bonding pads 58 as shown in FIG. 4(a).

Also, on wiring substrate 56 are patterned metallized patterns MP that enable power to be supplied to and outputs to be taken out from photodiode 26 and amplifier 27. Photodiode 26, which is disposed on the rear surface side of light transmitting substrate 50, is connected via bonding wires 29 to metallized pattern MP, disposed on wiring substrate 56, and amplifier 27.

Metallized patterns MP, disposed on the rear surface of wiring substrate 56 are connected to output bonding pads 57, disposed on top surface end portions of wiring substrate 56, via wirings CE inside contact holes. Input bonding pads 58 are connected via bonding wires 59 to metallized pattern 55 and laser diode 25.

Furthermore, light transmitting substrate 50 is housed inside a recessed portion of ceramic package 63 that has the recessed portion formed at the center. Input and output pads 64 are disposed on a top surface of an end portion of ceramic package 63. These input and output pads 64 are respectively connected to output bonding pads 57 or input bonding pads 58 via bonding wires 65. Electrical input and output terminals 66 are respectively mounted onto input and output pads 64.

Also, an opening above the recessed portion of ceramic package 63 is covered by a cap 67. Cap 67 is formed of metal, and jacketed fiber 62 is disposed on an outer side of cap 67. Metallized fiber 61, which connects jacketed fiber 62 to fiber ferrule 60 disposed inside cap 67, is interposed between cap 67 and ceramic package 63. By cap 67 and metallized fiber 61 being soldered together at this position, the interior of ceramic package 63 is put in an airtight state.

A procedure for manufacturing optical transmitting and receiving module 3 according to the present embodiment with the above arrangement shall now be described.

V-groove 51, lens grooves 52 and 54, and filter groove 53 are formed by anisotropic etching on the top surface of light transmitting substrate 50. Metallized pattern 55 is also provided. Then on the rear surface of light transmitting substrate 50, a metallized mark that is positioned with respect to V-groove 51 on the top surface is formed by a semiconductor process, and photodiode 26 is die bonded with high precision onto this metallized mark.

Amplifier 27 is die bonded onto a position adjacent to photodiode 26, and the rear surface of light transmitting substrate 50 is die bonded onto wiring substrate 56. The pads of photodiode 26 and amplifier 27 are then connected to wiring substrate 56 by bonding wires 29.

Die bonding and adhesion on the top surface of light transmitting substrate 50 are then performed. In regard to the die bonding and adhesion on the top surface, first, laser diode 25 is die bonded accurately onto metallized pattern 55. Ball lenses 22 and 24 and dielectric multilayer film filter 23 are then respectively set in lens grooves 52 and 54 and filter groove 53. In this process, each groove is used as a guide to set the corresponding element. Ball lenses 22 and 24 and dielectric multilayer film filter 23 are then respectively adhered onto lens grooves 52 and 54 and filter groove 53 by an epoxy-based or an acrylic based adhesive agent.

Light transmitting substrate 50 is then die bonded along with wiring substrate 56 onto ceramic package 63. Terminals of laser diode 25 are then connected via bonding wires 59 to input bonding pads 58 disposed on wiring substrate 56, and pads 57 and 58 on wiring substrate 56 are connected via bonding wires 65 to input and output pads 64 on ceramic package 63.

Thereafter, metallized fiber 61, having fiber ferrule 60 mounted onto the front end, is mounted so that fiber ferrule 60 is fitted onto V-groove 51 and is fixed by an epoxy-based or acrylic-based ultraviolet curing resin. By then soldering metallized fiber 61 onto ceramic package 63 and onto cap 67 at the same time, the interior of ceramic package 63 is sealed in an airtight manner. Optical transmitting and receiving module 3 is manufactured thus.

This optical transmitting and receiving module 3 has the light transmitting substrate incorporated in a package and, as in the first embodiment described above, has laser diode 25, which emits optical signals, and photodiode 26, onto which optical signals are made incident, and photodiode 26 is disposed on the rear surface side of light transmitting substrate 50. Because there is thus no need to separately provide a submount, etc., for installing photodiode 26, spatial restrictions are lessened accordingly. There is also no need to employ a side-illuminated type photodiode, etc.

Also, because as in the above-described first embodiment, filter groove 53 is formed by anisotropic etching, filter groove 53 can be formed accurately in terms of inclination angle. Light emitted from fiber ferrule 60 can thus be guided precisely to photodiode 26. Furthermore, V-groove 51 and lens grooves 52 and 54 are formed to predetermined depths by anisotropic etching. The respective elements, that is, fiber ferrule 60 and ball lenses 22 and 24, can thus be readily aligned precisely.

A fourth embodiment of this invention shall now be described. An optical transmitting and receiving module according to this embodiment mainly differs from the above-described first embodiment in that an optical waveguide is formed in place of an optical fiber. FIG. 5 is a sectional view of the optical transmitting and receiving module according to the fourth embodiment of this invention.

As shown in FIG. 5, optical transmitting and receiving module 4 according to this embodiment has a light transmission substrate 70 that is formed of a silicon substrate and transmits light. First lens groove 12, filter groove 13, and second lens groove 14 are disposed along a straight line on a top surface of light transmitting substrate 70. These grooves 12 to 14 are made the same in size as those described for the third embodiment above.

First ball lens 22 is set in first lens groove 12, dielectric multilayer film filter 23 is set in filter groove 13, and second ball lens 24 is set in second lens groove 14. Also, laser diode 25 is disposed along a straight extension line extending from first lens groove 12 to second lens groove 14 on light transmitting substrate 70. In the opposite direction of the straight line extending from first lens groove 12 to second lens groove 14 on light transmitting substrate 70, an optical waveguide 71 is formed along the straight line. Optical waveguide 71 is formed on light transmitting substrate 70 using polyimide, etc. By adjusting the thickness of polyimide, the height of a core portion of optical waveguide 71 can be adjusted to the height of an optical axis of light that passes through first ball lens 22.

Furthermore, on a rear surface side of light transmitting substrate 70, the same photodiode 26, amplifier 27, and wiring substrate 28 as those of the above-described first embodiment are positioned in the same positional relationship. Also, convex lens 31 is formed at a position of light transmitting substrate 70 through which light reflected from dielectric multilayer film filter 23 passes. In regard to the other points, the same arrangement as that of the above-described first embodiment is employed.

With optical transmitting and receiving module 4 according to the present embodiment of the above arrangement, optical waveguide 71 is formed in place of an optical fiber, and an optical input and output portion makes up a front end portion of optical waveguide 71. As in the above-described first embodiment, laser diode 25, which emits optical signals, and photodiode 26, onto which optical signals are made incident, are provided. Here, photodiode 26 is disposed on the rear surface side of light transmitting substrate 70. Because there is thus no need to separately provide a submount, etc., for installing photodiode 26, spatial restrictions are lessened accordingly. There is also no need to employ a side-illuminated type photodiode, etc.

Also, because as in the above-described first embodiment, filter groove 13 is formed by anisotropic etching, filter groove 13 can be formed accurately in terms of inclination angle. Light emitted from optical waveguide 71 can thus be guided precisely to photodiode 26. Furthermore, lens grooves 12 and 14 are formed to predetermined depths by anisotropic etching. Ball lenses 22 and 24 and other elements can thus be readily aligned precisely.

A fifth embodiment of this invention shall now be described. An optical transmitting and receiving module according to this embodiment mainly differs from the above-described third embodiment in that the optical fiber is of a type that is separated. FIG. 6 shows diagrams of the optical transmitting and receiving module according to the fifth embodiment of this invention, with FIG. 6(a) being a plan view and FIG. 6(b) being a sectional side view.

As shown in FIG. 6, optical transmitting and receiving module 5 according to this embodiment has a light transmitting substrate 80 that is formed of a silicon substrate and transmits light. On a top surface of light transmitting substrate 80 are formed filter groove 53 and second lens groove 54. Dielectric multilayer film filter 23 is set in filter groove 53, and second ball lens 24 is set in second lens groove 54.

On a rear surface side of light transmitting substrate 80 are disposed photodiode 26, amplifier 27, and wiring substrate

56. Light transmitting substrate 80 is furthermore housed in a ceramic package 81. The interior of ceramic package 81 is sealed in airtight manner by a plate-like cap 82.

A lens holder 83 is mounted by YAG welding to a side wall portion of ceramic package 81. This YAG welding is performed after a centering procedure. A first ball lens 84 is housed inside lens holder 83, and fiber ferrule 85 is inserted into lens holder 83. A jacketed fiber 87 is connected to fiber ferrule 85.

Furthermore, a through hole is formed in the side wall portion of ceramic package 81, and a transparent window 88 that closes this through hole is provided. Light emitted from fiber ferrule 85 reaches dielectric multilayer film filter 23 inside ceramic package 81 via first ball lens 84. Light of laser diode 25 that is transmitted through dielectric multilayer film filter 23 reaches fiber ferrule 85 via transparent window 88 and first ball lens 84. In regard to the other points, the same arrangement as that of the above-described third embodiment is employed.

With optical transmitting and receiving module 5 according to the present embodiment of the above arrangement, both fiber ferrule 85 and first ball lens 84 are housed inside lens holder 83, and lens holder 83 is fixed to the side wall portion of ceramic package 81. As in the above-described third embodiment, photodiode 26 is disposed on the rear surface side of light transmitting substrate 80 in optical transmitting and receiving module 5 according to this embodiment as well. Because there is thus no need to separately provide a submount, etc., for installing photodiode 26, spatial restrictions are lessened accordingly. There is also no need to employ a side-illuminated type photodiode, etc.

Also, because filter groove 53 is formed by anisotropic etching, filter groove 53 can be formed accurately in terms of inclination angle. Light emitted through transparent window 88 can thus be guided precisely to photodiode 26. Furthermore, lens groove 54 is formed to a predetermined depth by anisotropic etching. Second ball lens 24 and other elements can thus be readily aligned precisely.

Furthermore, with optical transmitting and receiving module 5 according to this embodiment, because a metallized fiber is not used as in the optical transmitting and receiving module according to the above-described third embodiment, the cost can be reduced accordingly.

With optical transmitting and receiving module 5 according to this embodiment, because fiber ferrule 85 and first ball lens 84 are not set on light transmitting substrate 80, centering must be performed separately. However, first ball lens 84 is fixed by a tapered portion formed at a front end of lens holder 83 into which fiber ferrule 85 is press fitted. The center of fiber ferrule 85 and the center of first ball lens 84 can thus be matched precisely. Moreover, because the light emitted from first ball lens 84 is collimated light, centering in the optical axis direction is unnecessary. Furthermore, the photodiode 26, laser diode 25, second ball lens 24, and dielectric multilayer film filter 23 are matched precisely in regard to positional relationship. It is thus sufficient to perform the centering work only in respect to a direction vertical to the optical axis and to perform the alignment only with respect to the laser light.

Though favorable embodiments of this invention have been described above, this invention is not restricted to the respective above-described embodiments. For example, though an optical transmitting and receiving module for home use was described with each of the embodiments above, the optical transmitting and receiving module according to this invention can also be used as an optical transmitting and receiving module for a base station. In this case, the laser diode emits light of the 1.55 μm band, and the dielectric film filter transmits light of the 1.55 μm wavelength band and reflects light of the 1.3 μm wavelength band. Also, though in each of the embodiments above, a back-illuminated photodiode is used as the photodiode, a front-illuminated photodiode may be used instead. Furthermore, though a silicon substrate is used as the light transmitting substrate in each of the embodiments above, for example, a glass substrate that transmits light may be used instead. In using a glass substrate, the respective grooves can be formed, for example, by processing by numerically controlled machine tool.

INDUSTRIAL APPLICABILITY

This invention can be used in an optical transmitting and receiving module for performing transmission and reception of optical signals in optical communication, optical information processing, etc.

The invention claimed is:

1. An optical transmitting and receiving module comprising:
   a light transmitting substrate for transmitting light of a first wavelength, the light transmitting substrate having first and second main surfaces opposed to each other through the light transmitting substrate;
   a laser diode, arranged in the first surface of the light transmitting substrate, for emitting light of a second wavelength that differs from the first wavelength;
   a photodiode, mounted on the second surface of the light transmitting substrate surface;
   a dielectric film filter for reflecting light of the first wavelength and transmitting light of the second wavelength;
   a first lens for guiding the light emitted from the laser diode to the dielectric film filter, the first lens set in a groove formed in the first main surface of the light transmitting substrate and between the laser diode and the dielectric film filter;
   an optical input/output portion for inputting light emitted from the laser diode and for outputting light to the photodiode;
   a second lens for guiding the light passing through the dielectric film filter and having the second wavelength to the optical input/output portion, the second lens being set in a groove formed in the first main surface of the light transmitting surface; and
   a converging lens formed on the first main surface of the light transmitting substrate for guiding light reflected from the dielectric film filter to a photodiode;
   the dielectric film filter being set in an inclined groove, formed on the first surface of the light transmitting substrate with a predetermined inclination angle in the light transmitting substrate, so as to match optical paths between the photodiode and the optical input/output portion and match optical paths between the laser diode and the optical input/output portion.

2. The optical transmitting and receiving module according to claim 1, wherein the light transmitting substrate is a silicon substrate.

3. The optical transmitting and receiving module according to claim 1, wherein the inclined groove is formed by anisotropic etching.

4. The optical transmitting and receiving module according to claim 1, wherein the photodiode is positioned directly below a line connecting the laser diode and the optical input/output portion.

5. The optical transmitting and receiving module according to claim 4, wherein a plurality of sets of the photodiode, the laser diode, and the dielectric film filter are disposed in array form.

6. The optical transmitting and receiving module according to claim 1, wherein the converging lens is formed by ion beam etching.

7. The optical transmitting and receiving module according to claim 1, wherein the optical input/output portion is a front end portion of an optical fiber.

8. The optical transmitting and receiving module according to claim 1, wherein the optical input/output portion is a front end portion of an optical waveguide.

* * * * *

UNITED STATES PATENT AND TRADEMARK OFFICE
CERTIFICATE OF CORRECTION

PATENT NO. : 7,486,846 B2
APPLICATION NO. : 10/589605
DATED : February 3, 2009
INVENTOR(S) : Yoshihisa Warashina et al.

It is certified that error appears in the above-identified patent and that said Letters Patent is hereby corrected as shown below:

Title Page

In Section (73) "Assignee" on the front page of the above-identified patent, delete
"Hammatsu"

and insert
--Hamamatsu--.

Signed and Sealed this

Twenty-first Day of April, 2009

JOHN DOLL
*Acting Director of the United States Patent and Trademark Office*